(12) United States Patent
Oijer (10) Patent No.: US 7,706,579 B2
(45) Date of Patent: Apr. 27, 2010

(54) IMAGE ORIENTATION FOR DISPLAY

(75) Inventor: Sten Fredrik Oijer, Lomma (SE)

(73) Assignee: Sony Ericsson Communications AB, Lund (SE)

( * ) Notice: Subject to any disclaimer, the term of this patent is extended or adjusted under 35 U.S.C. 154(b) by 615 days.

(21) Appl. No.: 11/614,553

(22) Filed: Dec. 21, 2006

(65) Prior Publication Data

US 2008/0152199 A1    Jun. 26, 2008

(51) Int. Cl.
*G06K 9/00*    (2006.01)
(52) U.S. Cl. .................. 382/118; 345/649; 382/296; 382/297
(58) Field of Classification Search .............. 382/118, 382/296, 305, 306, 313; 348/583; 358/403, 358/473; 345/649, 655, 656, 657, 659
See application file for complete search history.

(56) References Cited

U.S. PATENT DOCUMENTS

| | | | |
|---|---|---|---|
| 6,940,545 B1 * | 9/2005 | Ray et al. | 348/222.1 |
| 7,565,030 B2 * | 7/2009 | Steinberg et al. | 382/296 |
| 2001/0053292 A1 | 12/2001 | Nakamura | |
| 2003/0099395 A1 | 5/2003 | Wang et al. | |
| 2003/0152289 A1 | 8/2003 | Luo | |
| 2004/0201595 A1 * | 10/2004 | Manchester | 345/649 |
| 2005/0104848 A1 | 5/2005 | Yamaguchi et al. | |
| 2006/0098256 A1 | 5/2006 | Kameyama | |
| 2006/0204110 A1 | 9/2006 | Steinberg et al. | |
| 2009/0087042 A1 * | 4/2009 | Steinberg et al. | 382/118 |

FOREIGN PATENT DOCUMENTS

| | | |
|---|---|---|
| EP | 1 699 013 A1 | 9/2006 |
| WO | WO 2005/065283 A2 | 7/2005 |

OTHER PUBLICATIONS

International Search Report with Written Opinion in corresponding PCT Application No. PCT/IB2007/052357, dated Nov. 23, 2007, 11 pages.

* cited by examiner

*Primary Examiner*—Ulka Chauhan
*Assistant Examiner*—Donna J Ricks
(74) *Attorney, Agent, or Firm*—Harrity & Harrity, LLP (57) ABSTRACT

A device may include processing logic to obtain an image file including orientation information indicating a first orientation in which an image is to be displayed; detect, in the image, at least one human face; and modify the orientation information to re-orient the image based on the detected at least one human face.

19 Claims, 4 Drawing Sheets

IMAGE ORIENTATION FOR DISPLAY

BACKGROUND

1. Field of the Invention

Implementations described herein relate generally to images and, more particularly, to performing operations related to images.

2. Description of Related Art

Images of objects are captured and/or stored as frames having orientations relative to an orientation in which the images are to be viewed via a display. For example, an image frame is typically captured/stored in either a landscape view or a portrait view. Frame orientation is typically set according to either an actual orientation of the camera relative to the horizon during image capture or, in a camera equipped with a gravimeter (e.g., an accelerometer, gyro-sensor, etc.) and the like, a "corrected" orientation of the camera based on the acquired gravity information.

Naturally, objects appearing in the images have a particular orientation relative to the orientation in which the images are to be viewed via a display. As displayed, for example, an object(s) may be right-side up, sideways, or upside down. Cameras, image transmission devices, image storage devices, image-handling devices, display devices, and the like, orient image frames irrespective of the orientation of objects that appear in the images.

That is, such devices are not configured to determine, much less select, a proper orientation of image frames from the perspective of a viewer of the displayed images. Thus, viewing the displayed images in the proper orientation often requires that a viewer re-orient a displayed image, for instance, by rotating the display device itself or, if the display device is capable, performing an image frame rotation operation, etc. Naturally, such actions on the part of the viewer to achieve proper orientation of the images are inconvenient and cumbersome, particularly when viewing a large number of images and/or re-orienting on an image-by-image basis.

SUMMARY

According to one aspect, a method may include obtaining, by a device, an image having a first orientation with respect to a display; detecting, in the image, at least one human face having a second orientation; determining whether the first orientation differs from the second orientation; and performing, when the first orientation differs from the second orientation, an action to re-orient the image to the second orientation.

Additionally, the obtaining may include receiving the image at the device.

Additionally, the obtaining may include capturing the image via the device.

Additionally, the method may include storing the captured image in a memory of the device, where the detecting, determining, and performing occur before the storing.

Additionally, the performing the action may include creating or modifying an identifier associated with the image indicative of the first or second orientation based on the determining.

Additionally, the method may include storing the identifier with the image.

Additionally, the method may include sending the image with the stored identifier to another device.

Additionally, the method may include rendering the image via a display of the device based on the identifier.

Additionally, the performing the action may include re-orienting the image from the first orientation to the second orientation.

Additionally, the method may include displaying the re-oriented image via a display of the device.

Additionally, the re-orienting may include changing the second orientation from landscape orientation to portrait orientation or vice-versa.

Additionally, the re-orienting may include rotating the image by a predetermined angle.

Additionally, the method may include receiving an input from the user to initiate the detecting.

Additionally, the method may include detecting, in the image, another human face having a third orientation, where the second orientation differs from the third orientation; and determining, from the image, other orientation information, where the action is based on the other orientation information.

Additionally, the method may include receiving, from the user, a command to display the image, wherein the detecting is initiated upon the receiving the command.

According to another aspect, a device may include means for obtaining media including an image; means for determining a display orientation for the image; means for detecting at least one facial features that appears in the image; and means for re-orienting the image based on the detected at least one facial feature.

According to yet another aspect, a device may include processing logic to obtain an image file including orientation information indicating a first orientation in which an image is to be displayed; detect, in the image, at least one human face; and modify the orientation information to re-orient the image based on the detected at least one human face.

Additionally, the processing logic may be further configured to cause the modified orientation to be stored with the image file.

Additionally, the processing logic may be further configured to determine from the stored modified orientation that the image has been re-oriented; and cause the re-oriented image to be displayed without repeating the detection of the at least one human face.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Implementations consistent with principles of the invention may relate to determining image orientation based on object detection results, tagging a corresponding image file with image orientation information, and/or displaying images based on image orientation information. By using object (e.g., facial feature) detection technology to detect a person's face in an image and/or a sequence of images (e.g., video), the person's orientation may be determined and the image frame oriented for display. For example, a device may retrieve a media file (e.g., an image file) from storage or another mechanism (e.g., by taking a picture), and determine that a face appears in the image using face detection techniques. Facial features may be analyzed to determine an orientation of the face (e.g., head). Acquired orientation information may be included, for example, in a unique identifier associated with an image file.

"Image," as the term is used herein, is to be broadly interpreted to include any machine-readable and machine-storable data, graphic, electronic media, etc. An image may include, for example, information contained in an image file existing in any format for storing, performing operations on, transmitting, and/or displaying as visual information.

"Orientation information," as the term is used herein, is to be broadly interpreted to include any information deemed to be pertinent to rendering of an image or an object appearing in the image, for example, for display. Orientation information may be a reference to a predetermined axis with respect to a device (e.g., a display), a user of the device, the horizon, as between one image and another, and/or any other designated frame of reference.

"Re-orientation," as the term is used herein, is to be broadly interpreted to include any change to a previous orientation and/or orientation information. Re-orientating may include changing one or more aspects related to display of an image. An image, image frame, and/or object(s) appearing in an image may be re-oriented, for example, by planar rotation by any angle from 0 to 360 degrees, e.g., 90, 180, 270 degrees, or by any increment of angular measure.

A "device," as the term is used herein, is to be broadly interpreted to include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a camera unit, a Doppler receiver, and/or global positioning system (GPS) receiver; a laptop; a OPS device; a camera (e.g., video and/or still image camera), and any other computation or communication device capable of capturing, storing, transmitting, and/or displaying media, such as a personal computer, etc. A device may also include other computation devices with or without communication functionality. For example, a device may include a personal computer (PC), laptop computer, PDA, etc., with or without communication functionality discussed below.

Figure 1:
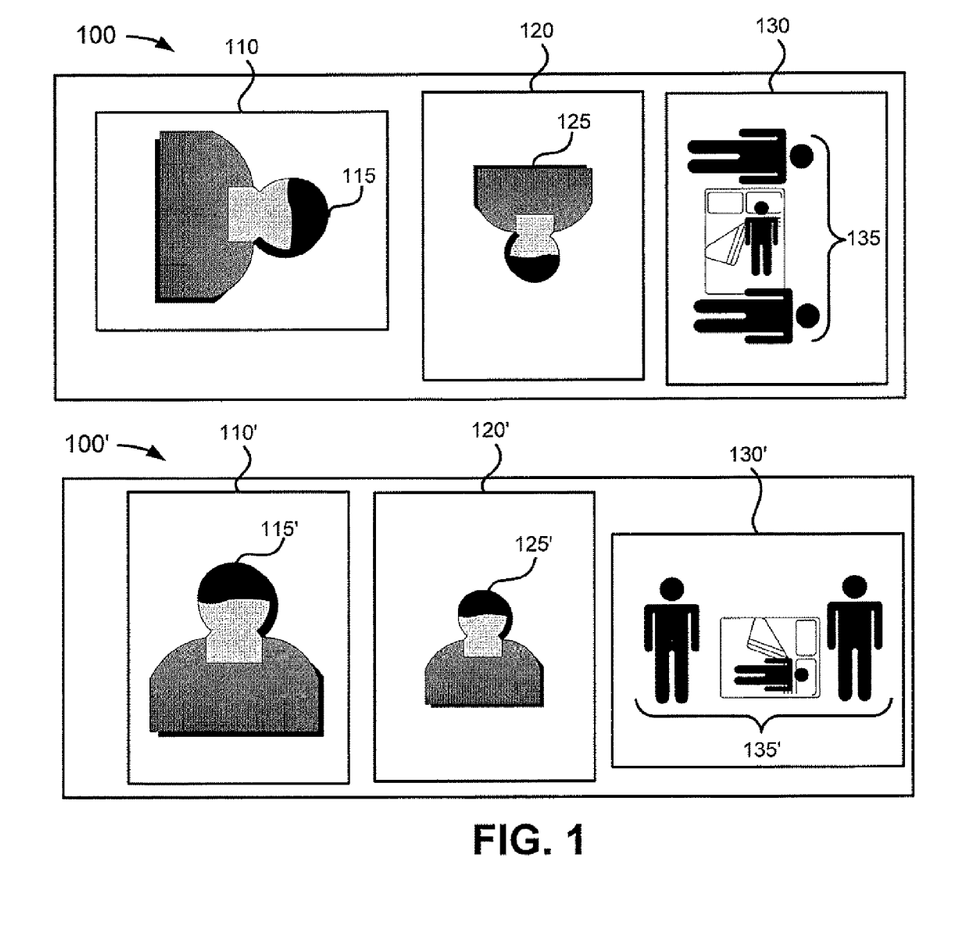
FIG. 1 is an exemplary diagram illustrating concepts consistent with principles of the invention.

FIG. 1 is an exemplary diagram illustrating concepts consistent with principles of the invention. As shown in FIG. 1, a number of image files containing images set in image frames 110-130 and 110'-130' may be rendered via a display device 100 and 100', respectively, for viewing by a user. The image frames may be oriented in various orientations relative to display device 100, 100'. For example, where image frames 110-130, 110'-130' are substantially rectangular, image frames 110-130, 110'-130' may be oriented in a portrait mode or a landscape mode relative to display device 100, 100'.

The images represented in image frames 110-130, 110'-130' may include pictured objects 115-135, 115'-135', for example, that include one or more persons. Objects 115-135, 115'-135' may appear in the images as being oriented in various orientations within image frames 110-130, 110'-130'. For example, objects 115-135, 115'-135' may appear as right-side up, sideways, upside down, or being at any other angle relative to, for example, a vertical or horizontal axis associated with image frames 110-130, 110'-130'.

Exemplary Device Architecture

Figure 2:
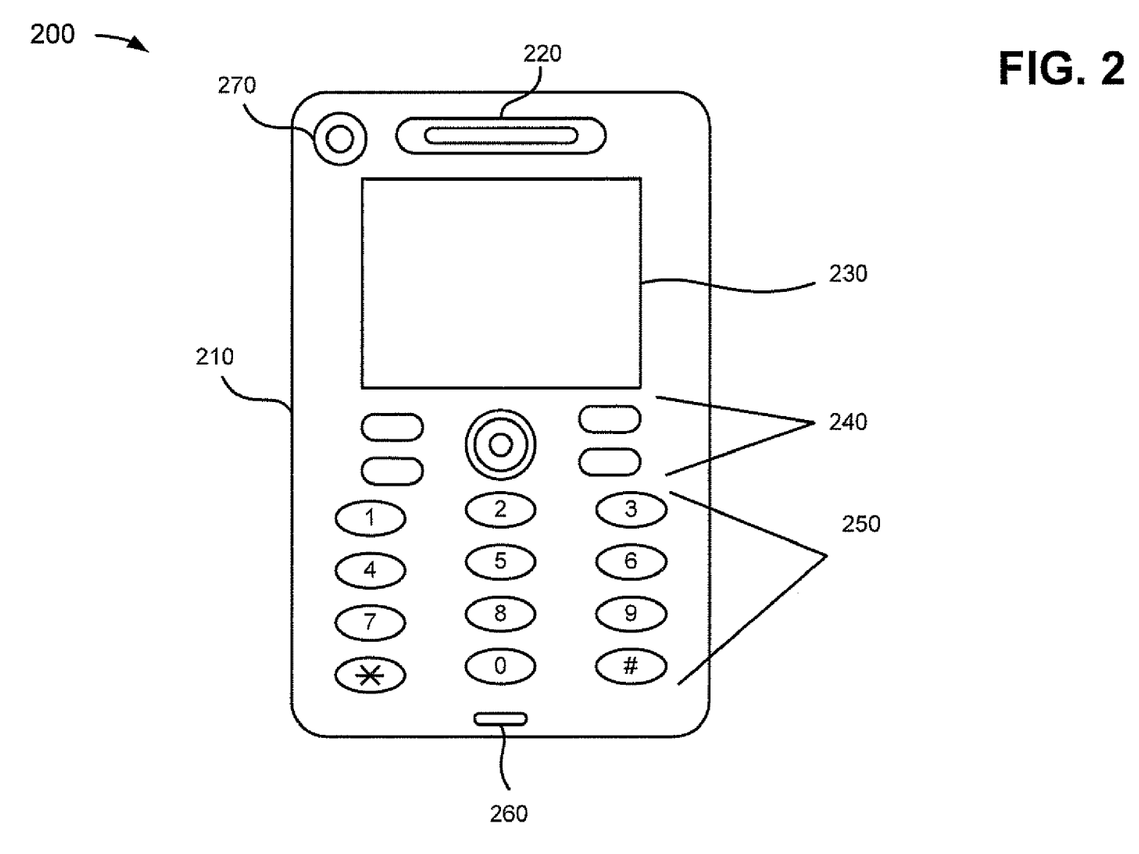
FIG. 2 is a diagram of an exemplary device in which systems and methods consistent with principles of the invention may be implemented.

FIG. 2 is a diagram of an exemplary device 200 according to an implementation consistent with principles of the invention. As shown in FIG. 2, device 200 may include a housing 210, a speaker 220, a display 230, control buttons 240, a keypad 250, a microphone 260, and a camera 270. Housing 210 may support the components of device 200. Speaker 220 may provide audible information to a user of device 200. Display 230 may provide visual information to a user of device 200. For example, display 230 may render media information, such as image frames and/or video, and/or function as a viewfinder in connection with the operation of camera 270. In an implementation consistent with principles of the invention, display 230 may display pictures for viewing by the user in the form of image frames capable of being displayed and/or manipulated. Control buttons 240 may permit the user to interact with device 200 to cause device 200 to perform one or more operations. Keypad 250 may include a standard telephone keypad. Microphone 260 may receive audible information from the user. In one implementation, control buttons 240, keypad 250, and/or microphone 260 may be used by the user to control operations, for example, for displaying, editing, etc., media information. Camera 270 may enable the user to capture and store video and/or images (e.g., pictures).

Figure 3:
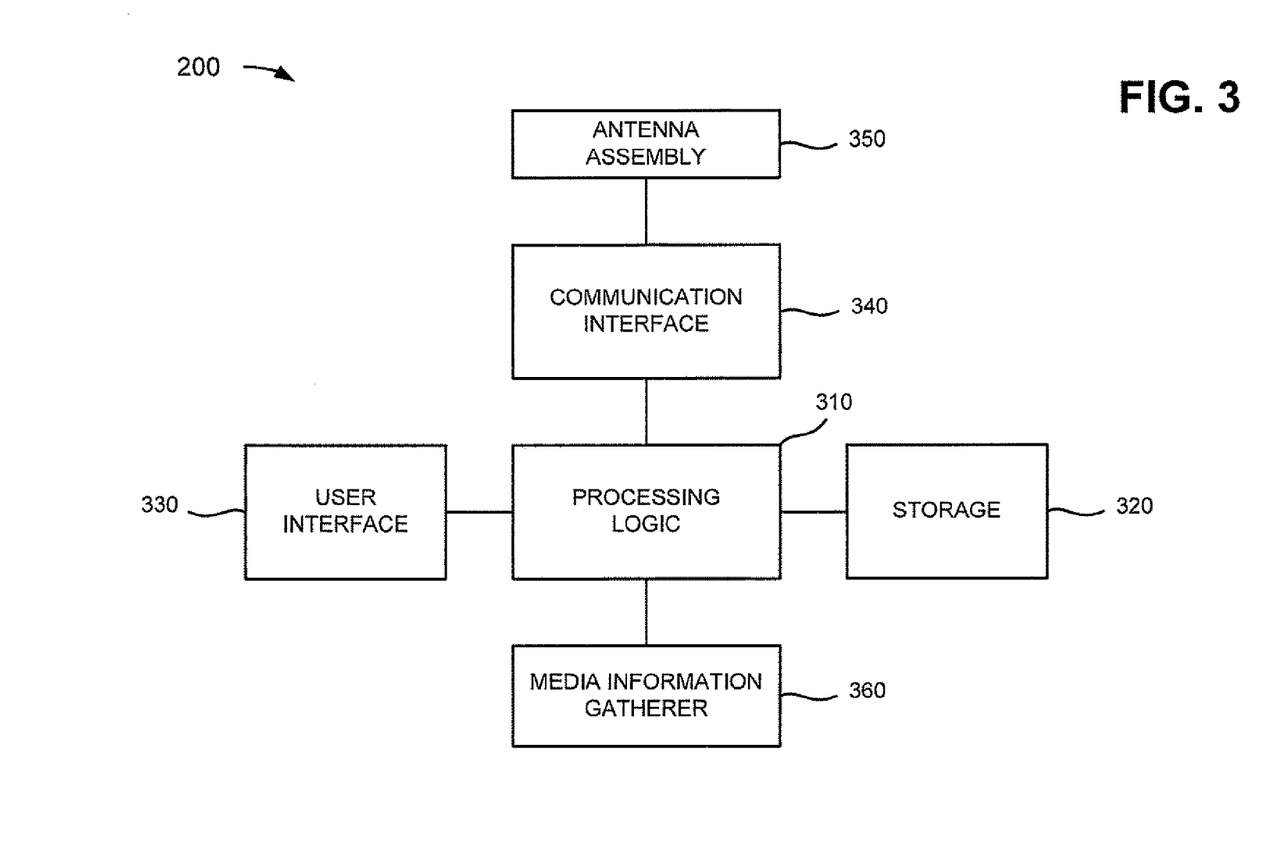
FIG. 3 is a diagram of exemplary components of the exemplary device of FIG. 2.

FIG. 3 is a diagram of exemplary components of device 200. As shown in FIG. 3, device 200 may include processing logic 310, storage 320, a user interface 330, a communication interface 340, an antenna assembly 350, and a media information gatherer 360. Processing logic 310 may include a processor, microprocessor, an application specific integrated circuit (ASIC), field programmable gate array (FPGA), or the like. Processing logic 310 may include data structures or software programs to control operation of device 200 and its components. Storage 320 may include a random access memory (RAM), a read only memory (ROM), and/or another type of memory to store data and instructions that may be used by processing logic 310.

User interface 330 may include mechanisms for inputting information to device 200 and/or for outputting information from device 200. Examples of input and output mechanisms might include a speaker (e.g., speaker 220) to receive electrical signals and output audio signals, a camera (e.g., camera 270) to receive image and/or video signals and output electrical signals, a microphone (e.g., microphone 260) to receive audio signals and output electrical signals, buttons (e.g., a joystick, control buttons 240 and/or keys of keypad 250) to permit data and control commands to be input into device 200, a display (e.g., display 230) to output visual information (e.g., information from camera 270), and/or a vibrator to cause device 200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air.

Antenna assembly 350 may receive RF signals from communication interface 340 and transmit the RF signals over the air and receive RF signals over the air and provide them to communication interface 340. In one implementation, for example, communication interface 340 may communicate with a network (e.g., a wireless network, a cellular network, a local area network (LAN), a wide area network (WAN), a telephone network, such as the Public Switched Telephone Network (PSTN), an intranet, the Internet, or a combination of networks).

Media information gatherer 360 may obtain media information (e.g., images as images files) from device 200. In one implementation, the media information may correspond to media stored on device 200 or received by device 200 (e.g., by communication interface 340). In this case, media information gatherer 360 may include a media storage device (e.g., storage 320), or a communication device (e.g., communication interface 340) capable of receiving media from another source (e.g., wired or wireless communication with an external media storage device). In another implementation, the media information may correspond to media captured or retrieved by device 200. In this case, media information gatherer 360 may include a camera unit (e.g., camera 270) and/or interface with a camera unit that may record images and/or videos. The captured media may or may not be stored in a media storage device (e.g., storage 320).

As will be described in detail below, device 200, consistent with principles of the invention, may perform certain operations relating to media (e.g., image frame) orientation based on the media inform-nation. Device 200 may perform the operations in response to processing logic 310 executing software instructions of an application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Media Orientation

Returning to FIG. 1, exemplary media orientation methods described herein are illustrated as being performed on image frames 110-130 displayed via display 100, resulting in re-oriented images frames 1100'-130' as displayed via display 100'.

As shown in FIG. 1, image frame 110 may include a rectangular-shaped frame that may be oriented in a landscape mode. For example, image frame may be stored as an image file having an associated file identifier. The file identifier associated with image frame 110 may include orientation information in an orientation field, for example, indicating an orientation in which image frame 110 is to be displayed. Display 100 and/or processing logic associated with display 100 may be configured to read the file identifier and determine the orientation specified therein, and render image frame 110 in the specified orientation, i.e., in a landscape view. Similarly, image frames 120 and 130 may be rendered via display 100 based on orientation information included in file identification information associated with their corresponding file images. Here, image frames 120 and 130 are shown as being displayed in a portrait view.

As can be seen, from FIG. 1, objects 115-135 in image frames 110-130 may include one or more persons that include, for example, headshots or partial headshots. The headshots may include discernible facial features. As can also be seen, one or more of objects 115-135 may be arranged (i.e., oriented) other than right-side up (i.e., incorrectly oriented) with respect to a viewer of display 100. Accordingly, image frames 110-130 may be considered to be improperly oriented with respect to a viewer of display 100, or at least with respect to one another.

Figure 4:
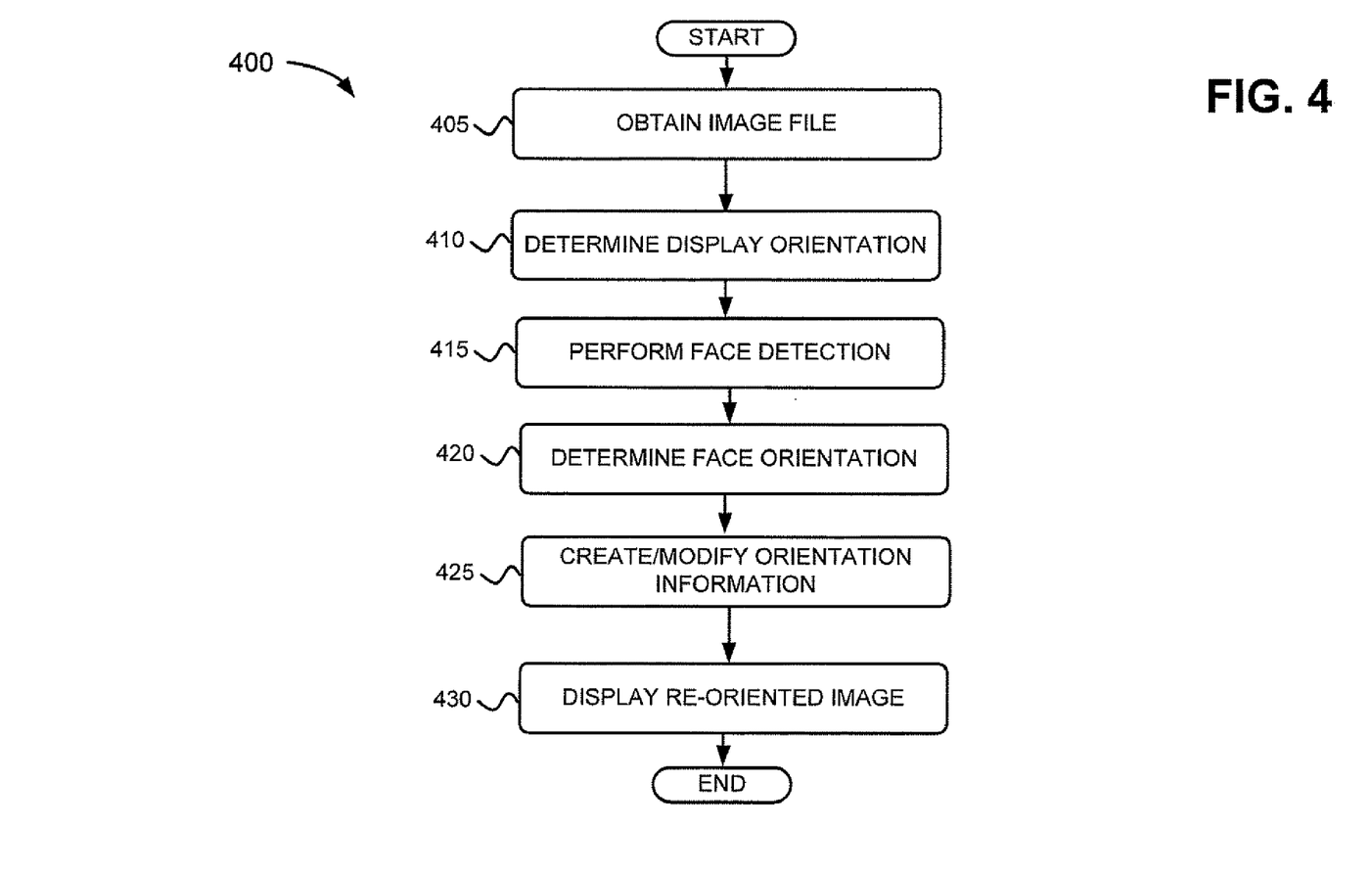
FIG. 4 is a flowchart of exemplary processing according to implementations consistent with principles of the invention.

FIG. 4 is a flowchart of an exemplary process according to an implementation consistent with principles of the invention for automatic orientation of media for display. As shown in FIG. 4, a process 400 may obtain media information, such as an image file including image frame 110 (block 405). For example, in one implementation described above in connection with FIG. 3, the media information (e.g., image frames) may correspond to media stored on device 200 or received by device 200 (e.g., via communication interface 340). In the latter case, media information gatherer 360 may include a media storage device (e.g., storage 320), or a communication device (e.g., communication interface 340) capable of receiving media from another source. In either case, processing logic 310 may obtain the image file including image frame 110.

Image frame 110 may be identified in the image file with a file identifier. The file identifier may indicate a display orientation (e.g., landscape) in which image frame 110 is to be displayed. The display orientation associated with image frame 110 may be determined from the file identifier (block 410). For example, in one implementation, processing logic 310 may include logic to read the file identifier.

One or more operations may be performed with respect to object(s) 115 in image frame 110. In one implementation, a face detection analysis may be performed on object 115 (block 415). For example, processing logic 310 may include face detection algorithms and the like that may be used to detect one or more facial features (e.g., eyes, ears, nose, mouth, hairline, eyebrows, teeth, lips, etc.) of object 115. Based on the results of the analysis, processing logic 310 may determine that object 115 includes at least a partial image of a person's face and/or head.

Based on the determination that object 115 includes at least a portion of a person's face, an orientation of object 115 may be determined (block 420). For example, a further analysis of object 115 using, for example, face detection techniques, may be performed to determine an orientation of object 115 within image frame 110. For example, processing logic 310 may be configured to determine a location of one or more facial features (e.g., eyes, ears, nose, mouth, hairline, eyebrows, teeth, lips, etc.) and, based on spatial relationships of the facial features, and the like, a "proper" orientation of object 115 may be made. For example, processing logic 310 may determine that object 115 is stored as an image that is sideways within image frame 110.

Based on the determination of the display orientation of image frame 110 and the proper orientation of object 115, orientation information (e.g., a tag) may be created or modified to indicate a portrait mode orientation for image frame 110 (block 425). In this case, orientation information may result in image frame 110 being re-oriented from a landscape mode to image frame 110' in the portrait mode. That is, image frame 110 may be rotated counter-clockwise by an angle of about 90 degrees, in this example.

Re-oriented image frame 110' may be rendered via display 100', for example, so that object 115' is righted as displayed (block 430). For example, object 115' may be upright when viewed via display 100' by a user. The orientation information, such as the tag, may be used when displaying image frame 110' in subsequent retrievals. That is, the tag indicates the "correct" orientation of image frame 110'.

In another implementation, process 400 may obtain media information, such as an image file including image frame 120 in which object 125 may appear. File identification information associated with image frame 120 may indicate a portrait mode for displaying image frame 120. A face detection analysis may determine that object 125 includes an individual's face. It may further be determined, based on the face detection analysis, that object 125 is inverted within image frame 120. That is, the top of the person's head may be pointed downward in the picture as oriented within image frame 120. Orientation information associated with the corresponding image file may be created or modified to indicate a portrait mode for image file 120 being re-oriented by rotation of image frame 120 by an angle of about 180 degrees, in this example. The "correct" orientation information may be stored with image frame 120' for subsequent retrieval of image frame 120'.

Re-oriented image frame 120' may be rendered via display 100', for example, so that object 125' is righted as displayed. For example, object 125' may be upright when viewed via display 100' by a user.

In another implementation, process 400 may obtain media information, such as an image file including image frame 130 in which object 135 may appear. File identification information associated with image frame 130 may indicate a portrait mode for displaying image frame 130. A face detection analysis may determine that object 135 includes three faces of individuals. It may further be determined, based on the face detection analysis, that two of the faces appearing in object 135 are oriented in a first direction within image frame 130, and that another face appearing in object 135 is oriented in a different direction within image frame 130. In one implementation, when orientation information is inconclusive as to the "proper" alignment or orientation based on the face detection analysis, further analysis of image 135 may be performed to make the determination. Assume, for example, that through the further analysis of object 135, processing logic 310 determines that additional orientation information indicates that one of the individuals detected in object 135 is in a prone position (e.g., lying on a bed). Based on the additional orientation information, orientation information associated with the corresponding image file may be created or modified to indicate a landscape mode for image file 130 being re-oriented by rotation of image frame 130 by an angle of about 90 degrees in the counter-clockwise direction.

Re-oriented image frame 130' may be rendered via display 100', for example, so that object 135' is righted as displayed. For example, object 135' may be upright when viewed via display 100' by a user. The modified orientation information may be stored with image frame 130' for subsequent use when displaying image frame 130'.

In another implementation, if the acquired orientation information is inconclusive as to a "correct" orientation of an image frame, the image frame may be left in a previous orientation. In another implementation, the user may be notified of an inconclusive determination and, for example, given the option to designate the orientation upon viewing the image frame. The user selected orientation may then be stored with the image file as the file identifier. Upon subsequent retrievals of the image file, the image may be displayed based on the user's previously selected orientation. In another implementation, the device (e.g., device 200) may be configured to present a user with an option to override an orientation determination.

In still other implementations, once the orientation has been modified (e.g., corrected), the file identifier may include an indication that the image frame has been re-oriented. For example, a designated field in the file identifier may be set to indicate whether the orientation has been re-oriented. Processing logic 310 may subsequently determine from the designated field that the corresponding image frame has been re-oriented. Based on this determination, processing logic may not perform one or more of the orientation processes described above, for example, face detection.

CONCLUSION

Implementations consistent with principles of the invention may establish proper image frame orientation based on, for example, facial feature detection results for an image file, and may orient and/or re-orient the image frame to the proper orientation. By using image frame orientation using face detection techniques, proper orientation information may be included in file information that may be used in displaying the image frame in the proper orientation.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 4, the order of the acts may be modified in other implementations consistent with principles of the invention. Further, non-dependent acts may be performed in parallel. Still further, although implementations described above discuss orientation processes performed on stored images, orientation processes may alternatively be performed with respect to captured images before the images are stored as files or other media. That is, display 100 may be a viewfinder, and the face detection techniques may be performed on an image appearing in the view finder, i.e., before the picture is "taken," or before the image is stored for subsequent retrieval. Still even further, although the image frames are shown as being displayed via display 100, 100' in the "before and after" views, any one or all of the above-described orientation processes may be performed in a device without display of the image frame on which the process(es) is being performed. That is, image orientation/re-orientation of image frames associated with image files may be achieved as a "background" process, in which the image frames are not displayed. A device may be configured to initiate orientation/re-orientation processes upon capture of image frames, receipt of images frames, display of image frames, transmission of images frames, user selection, etc. In a still further implementation, the above-described orientation/re-orientation processes may be included with other features for user-editing of images (e.g., cropping, resizing, adjusting resolution, removing red-eye, etc.).

Still further, aspects described herein focus on using face detection to identify correct orientation of images. In other implementations, other types of image reconciling techniques may be used. For example, image detection technology that detects, for example, the horizon or other feature(s) in an image may be used to detect proper orientation. This may be beneficial for orientating image frames in which persons/faces do not appear in the images.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed in a device, comprising:
   obtaining, by the device, an image having a first orientation with respect to a display of the device;
   detecting, in the image, a plurality of human faces arranged in a number of different orientations;
   analyzing the number of different orientations to determine orientation information associated with the image;
   determining whether the orientation information identifies a particular orientation of the image with respect to the display;
   detecting, upon a determination that the orientation information does not identify the particular orientation, at least one feature in the image other than the plurality of human faces;
   analyzing an orientation of the at least one feature, with respect to the display, to determine additional orientation information;
   reconciling the orientation information associated with the image and the additional orientation information associated with the image to determine a second orientation;
   determining whether the first orientation differs from the second orientation; and
   performing, when the first orientation differs from the second orientation, an action to re-orient the image to the second orientation.

2. The method of claim 1, where said obtaining comprises receiving the image at the device.

3. The method of claim 1, where said obtaining comprises capturing the image via the device.

4. The method of claim 3, further comprising:
   storing the captured image in a memory of the device.

5. The method of claim 1, where the performing the action comprises:
   creating or modifying an identifier associated with the image indicative of the first or second orientation.

6. The method of claim 5, further comprising:
   storing the identifier with the image.

7. The method of claim 6, further comprising:
   sending the image with the stored identifier to another device.

8. The method of claim 6, further comprising:
   rendering the image via a display of the device based on the identifier.

9. The method of claim 1, where the performing the action comprises reorienting the image from the first orientation to the second orientation.

10. The method of claim 9, further comprising:
    displaying the re-oriented image via the display of the device.

11. The method of claim 9, where the re-orientating comprises:
    changing the second orientation from landscape orientation to portrait orientation or vice-versa.

12. The system of claim 9, where the re-orienting comprises rotating the image by an angle of about 90, 180, or 270 degrees.

13. The method of claim 1, further comprising:
    receiving an input from the user to initiate the detecting the plurality of human faces.

14. The method of claim 1, where the image comprises an image file stored in a memory of the device.

15. The method of claim 1, further comprising:
    receiving, from the user, a command to display the image, where the detecting the plurality of human faces is initiated upon the receiving the command.

16. A device comprising:
    means for obtaining media including an image in an image frame;
    means for determining a first display orientation of the image frame;
    means for detecting facial features associated with a plurality of human faces that appear in the image;
    means for analyzing orientations of the human faces to determine orientation information associated with the image;
    means for determining that the orientation information does not identify a particular display orientation for the image frame;
    means for determining, upon determining that the orientation information does not identify a particular display orientation, additional orientation information, associated with at least one feature other than the plurality of human faces, indicative of a second display orientation;
    means for determining whether the first display orientation differs from the second display orientation; and
    means for re-orienting, when the first display orientation differs from the second display orientation, the image frame from the first display orientation to the second display orientation.

17. A device comprising:
    a display; and
    processing logic to:
        obtain an image file including orientation information indicating a first orientation in which an image is to be displayed;
        detect, in the image, a plurality of human faces arranged in a number of different orientations;
        analyze the number of different orientations to identify a particular orientation in which the image is to be displayed;
        determine that the particular orientation in which the image is to be displayed cannot be identified from the analysis of the number of different orientations;

detect, upon the determination that the particular orientation cannot be identified, at least one feature in the image other than the plurality of human faces;
analyze an orientation of the at least one feature;
reconcile the number of different orientations to the orientation of the at least one feature to determine a second orientation;
determine whether the first orientation differs from the second orientation; and
re-orient the image upon determining that the first orientation differs from the second orientation.

18. The device of claim 17, where the processing logic is further to:
cause the modified orientation to be stored with the image file.

19. The device of claim 18, where the processing logic is further to:
determine from the stored modified orientation that the image has been re-oriented; and
cause the re-oriented image to be displayed without repeating the detection of the at least one human face.

* * * * *

UNITED STATES PATENT AND TRADEMARK OFFICE
CERTIFICATE OF CORRECTION

PATENT NO. : 7,706,579 B2
APPLICATION NO. : 11/614553
DATED : April 27, 2010
INVENTOR(S) : Sten Fredrik Oijer It is certified that error appears in the above-identified patent and that said Letters Patent is hereby corrected as shown below:

On the cover page, (73) Assignee: should spell: Sony Ericsson Mobile Communications AB, Lund (SE)

Signed and Sealed this

Twenty-second Day of June, 2010

David J. Kappos
*Director of the United States Patent and Trademark Office*